US007010114B2

(12) United States Patent
Stahl et al.

(10) Patent No.: US 7,010,114 B2
(45) Date of Patent: Mar. 7, 2006

(54) SS7 SIGNALING SERVER WITH INTEGRATED ADVANCED SIGNALING SERVICES

(75) Inventors: Bernd Stahl, Leonberg (DE); Uwe Spitzer, Backnang (DE); Rudolf Salomon, Flein (DE); Albert Henger, Stuttgart (DE); Andreas Breiholz, Grossbottwar (DE)

(73) Assignee: Alcatel, Paris (FR)

( * ) Notice: Subject to any disclaimer, the term of this patent is extended or adjusted under 35 U.S.C. 154(b) by 319 days.

(21) Appl. No.: 10/656,125

(22) Filed: Sep. 8, 2003

(65) Prior Publication Data

US 2004/0052240 A1 Mar. 18, 2004

(30) Foreign Application Priority Data

Sep. 16, 2002 (EP) ................................. 02360267

(51) Int. Cl.
*H04L 12/28* (2006.01)
*H04M 7/00* (2006.01)

(52) U.S. Cl. .................. 379/221.1; 370/351; 370/389; 379/221.11

(58) Field of Classification Search ................ 370/351, 370/352, 353, 354, 355, 356, 389; 379/221.08, 379/221.09, 221.1, 221.11, 221.12, 230
See application file for complete search history.

(56) References Cited

U.S. PATENT DOCUMENTS

| | | | | |
|---|---|---|---|---|
| 5,712,908 | A * | 1/1998 | Brinkman et al. | 379/114.24 |
| 6,006,098 | A | 12/1999 | Rathnasabapathy et al. | |
| 6,011,803 | A * | 1/2000 | Bicknell et al. | 370/467 |
| 6,366,658 | B1 * | 4/2002 | Bjornberg et al. | 379/221.08 |
| 6,631,186 | B1 * | 10/2003 | Adams et al. | 379/201.12 |
| 6,714,533 | B1 * | 3/2004 | Weich et al. | 370/352 |
| 6,731,741 | B1 * | 5/2004 | Fourcand et al. | 379/221.08 |
| 6,826,198 | B1 * | 11/2004 | Turina et al. | 370/467 |
| 2002/0064271 | A1 | 5/2002 | Stumer | |
| 2002/0131400 | A1 * | 9/2002 | Tinsley et al. | 370/352 |
| 2003/0228012 | A1 * | 12/2003 | Williams et al. | 379/212.01 |

FOREIGN PATENT DOCUMENTS

WO WO 02060192 A2 8/2002

OTHER PUBLICATIONS

U.S. Appl. No. 10/642,687, filed Aug. 19, 2003.

* cited by examiner

*Primary Examiner*—Harry S. Hong
(74) *Attorney, Agent, or Firm*—Sughrue Mion, PLLC

(57) ABSTRACT

The inventive SS7 signaling server for routing SS7 links, includes a signaling transfer point (STP) and a signaling application server (SAS). STP and SAS have different functionalities. The STP has at least one external interface to connect the STP via at least one SS7 link to at least one telecommunications unit, and an internal interface to connect the STP to the SAS. The STP processes incoming SS7 messages, e.g. in the SCCP layer. The SAS is capable to process at least one, advantageously at least two different application service requests. The STP identifies a single application service request in one incoming SS7 message and provides the identified single application service request to the SAS for further processing. The SAS has e.g. two TCAP processes to identify two different application services, e.g. INAP and MAP. STP and SAS are interconnected via an internal interworking protocol, e.g. using TCP/IP.

14 Claims, 8 Drawing Sheets

Fig. 1
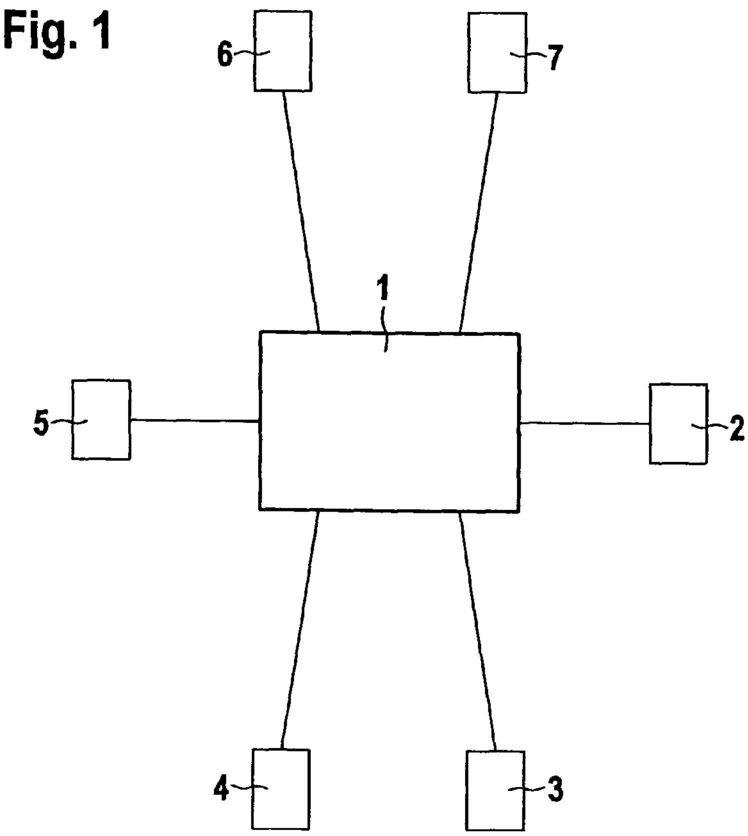
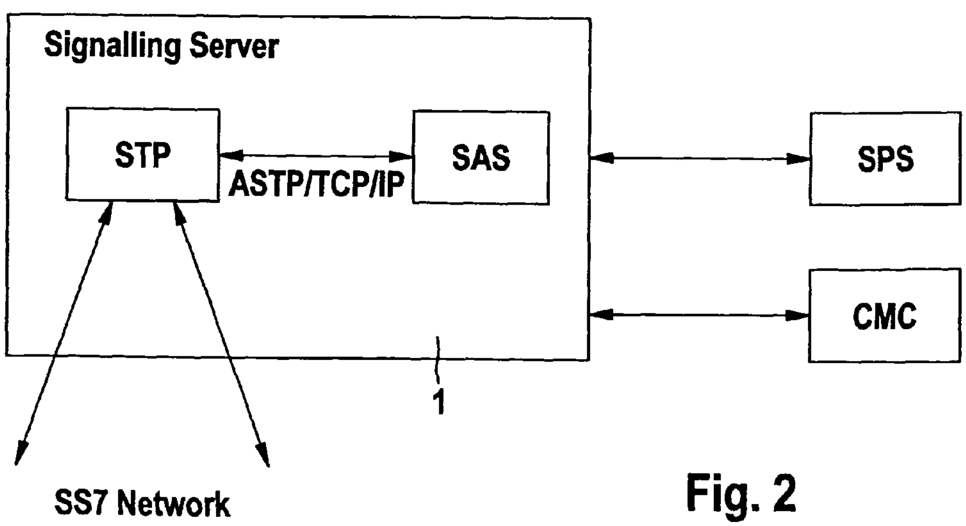
Fig. 2

SS7 SIGNALING SERVER WITH INTEGRATED ADVANCED SIGNALING SERVICES

TECHNICAL FIELD OF THE INVENTION

This invention is related in general to the field of telecommunications systems. More particularly, the invention is related to a SS7 signaling server and method for routing SS7 links in a telecommunications network.

The invention is based on a priority application, EP 02360267.5, which is hereby incorporated by reference.

BACKGROUND OF THE INVENTION

Wireless or Personal Communication Service (PCS) providers have been, until recently, able to store and maintain subscriber information and current location data on only one home location register (HLR). However, due to the escalating number of subscribers and the rapid expansion of the wireless (PCS) communications networks, it has become necessary to employ multiple home location registers to accommodate the growth.

By using multiple home location registers in the wireless communications network, it becomes necessary to devise a system and method to route the query messages and location updates to the proper home location register. One solution is to provide a database in the service control point (SCP) in the telecommunications network, which maintains routing information. However, a serious drawback with this solution is the additional traffic it may cause in the signaling system no. 7 (SS7) network by routing these additional queries from the mobile switching centers (MSCs) to the service transfer points (STPs) and then to the service control point. These queries add to the existing signaling traffic that accomplish toll-free calling, number portability, and other global title translation (GTT) queries to provide services such as line information database (LIDB) services, switch based services (SBS) such as certain Bellcore's CLASS.RTM. services, calling name (CNAM) delivery, and interswitch voice messaging (ISVM). Due to the anticipated large overall query volume, the SS7 link set between the service control point and signal transfer point becomes a troublesome bottleneck, creating a potentially substantial negative impact to the network's ability to route calls and provide services.

Accordingly, a need has arisen for a solution to the application location register routing problem for multiple home location registers. The teachings of U.S. Pat. No. 6,006,098 provides a system and method for application location register routing which addresses this problem. In one aspect, a method for application location register routing in a signal transfer point in a wireless telecommunications network is provided. The method includes the steps of receiving a query message requesting for information related to a specific mobile telecommunications customer, decoding the query message and obtaining a translation type and a global title address therefrom, looking up the translation type in a first database residing in the signal transfer point and determining a location of a second database residing in the signal transfer point for processing the query message. Thereafter, at least a predetermined portion of the global title address is used to look up, in the second database residing in the signal transfer point, to obtain a network address of a destination for processing the query message. The query message is then forwarded to a network node in the wireless telecommunications network specified by the network address.

In another aspect, a system for application location register routing in a wireless telecommunications network includes a first cluster of processors adapted for receiving a query message requesting for information related to a specific mobile telecommunications customer, a first database being accessible by the first cluster of processors and having location information of a second database, and a second cluster of processors co-located with the first cluster of processors and being adapted for receiving at least a portion of the query message from the first cluster of processors. The second cluster of processors is dedicated to process application location register routing. A second database is accessible by the second cluster of processor and stores network addresses specifying the destinations of the query messages. The second cluster of processors are adapted to obtaining the network addresses from the second database and forwarding the network address to the first cluster of processors.

In FIG. 1 of U.S. Pat. No. 6,006,098 a block diagram of a telecommunications network for wireless call delivery and services is shown. The telecommunications network is preferably constructed pursuant to the Advanced Intelligent Network (AIN) architecture. The telecommunications network includes a number of wireless service subscribers who are in communications with a base station (BS) via a number of land-based transmission towers and/or satellite-based wireless transponders. A base station may be coupled to at least one mobile switching center (MSC), which is further coupled to a network of mobile switching centers. Mobile switching centers are further coupled to a pair of signal transfer points (STPs) which each includes an application location register (ALR) subsystem. Signal transfer points and mobile switching centers may be coupled to a public switched telephone network.

The telecommunications network further includes service control points (SCPs) that may include multiple home location register (HLR) databases.

Service control points may be coupled to an authentication center (AC) database. A service management system (SMS) is coupled to service control points, authentication center, a service control point having a short message service center (SMSC) database, and an intelligent peripheral (IP). Short message service center may support voice mail, email, paging, and other services supported by the mobile telecommunications network. A user interface which may be a computer platform, workstation, or terminal, is coupled to service management system. A service creation environment (SCE) is coupled service management system, and also may utilize a user interface.

Service control points are coupled to signal transfer points via signaling system no. 7 (SS7) link sets, e.g. specified by the American National Standard Institute (ANSI). An SS7 link set may include up to sixteen 56 Kb/s links. Signal transfer points are further interconnected to mobile switching centers via SS7 link sets.

Signal transfer points may include global title translation (GTT) databases such as local number portability (LNP), line information (LIDB), switch based services, calling name (CNAM), and interswitch voice messaging (ISVM) databases containing routing data related to each service. In addition, when the wireless service provider requires the use of multiple home location registers, an application location register database is needed to identify the home location register that maintains a particular subscriber's service information.

A telecommunications service designer may design and implement a call service at service creation environment via user interface. The service logic and database schema may then be downloaded to service management system for distribution to other network components, such as intelligent peripheral, service control points, authentication center, etc. System management, maintenance and administration may be performed at service management system via a user interface.

In the telecommunications network, calls may originate from a non-wireless telephone customer to another non-wireless telephone customer, from a wireless telephone customer to another wireless telephone customer, from a non-wireless telephone customer to a wireless telephone customer, and vice versa.

In FIG. 2 of U.S. Pat. No. 6,006,098, a block diagram of a subsystem of signal transfer point with added database and processing units for application location register is shown. The signal transfer point includes a message transport network (MTN) backbone which provides communication between clusters of processors. One cluster of processors may perform administration, maintenance, and communication functions for system. Other clusters process SS7 signaling messages that are transmitted on SS7 link sets to signal transfer point. One SS7 cluster may be designated for local number portability, for example, which includes a transport node controller (TNC) coupled to common channel distributors (CCDs), a distributed SS7 services processor (DSS), and common channel links (CCLKs) via a network. A second SS7 cluster may be devoted to application location registration and may similarly include a transport node controller coupled to common channel distributors, a distributed SS7 services processor, and common channel links via a network. The system may include additional SS7 clusters for other global title translation processes or routing to processors within system, which may be similarly equipped with a transport node controller, common channel distributors, and common channel links, linked together by a network. It may be seen that transport node controllers, common channel distributors, and distributed SS7 services processors of each cluster are shown as processor pairs. The processor pairs may operate in standby or load sharing modes. The processors may also include fault tolerant multiprocessor engines with built-in redundancy.

Administration cluster also includes a transport node controller coupled to an administration processor, a traffic metering and measurement (TMM) processor, and an ethernet controller. Ethernet controller may be coupled to a user interface or workstation which is also coupled to service management system. Craft personnel may perform system maintenance and administrative functions via user interface and administration cluster.

The databases of the STPs are limited to determine the global title translation destination network address for the specified home location register or short message service center, or any other services associated with the mobile telecommunications subscription. Once the network address is obtained, it is returned to the common channel distributor to continue SCCP processing.

SUMMARY OF THE INVENTION

It is an object of the invention to provide a signaling server, which enables processing of different signaling application services for fixed and/or mobile users independently from the topology of the network.

The inventive SS7 signaling server for routing SS7 links, includes a signaling transfer point (STP) and a signaling application server (SAS); SS7=Signaling System No. 7. STP and SAS have different functionalities. The STP has at least one external interface to connect the STP via at least one SS7 link to at least one telecommunications unit, and an internal interface to connect the STP to the SAS. The STP processes incoming SS7 messages, e.g. in the MTP1, MTP2, MTP3, and SCCP layer. The SAS is capable to process at least one application service request, advantageously at least two different application service requests. The STP identifies a single application service request in one incoming SS7 message and provides the identified single application service request to the SAS for further processing. The SAS has e.g. two TCAP processes to identify two different application services, e.g. INAP and MAP. STP and SAS are interconnected via an internal interworking protocol, e.g. using TCP/IP (transmission control protocol/internet protocol). The interworking protocol is called Advanced Signaling Transport Protocol (ASTP).

The inventive signaling server is highly configurable and efficient regarding run-time. The signaling server is capable of processing multiple application service requests, e.g. mobile number portability (MNP), service number portability (SNP), screening, intelligent network (IN) services, TCAP services, MAP services, CAP services, TCAP Relay, TCAP User Relay, SCCP Relay.

The inventive SS7 signaling server for routing SS7 links includes a signaling transfer point (STP) and a signaling application server (SAS), wherein the STP has at least one external interface to connect the STP via at least one SS7 link to at least one telecommunications unit, and an internal interface to connect the STP to the SAS, wherein the SAS is capable to process at least one application service request, advantageously at least two different application service requests, and wherein the STP is capable to process incoming SS7 messages, to identify a single application service request in one incoming SS7 message, to provide the identified single application service request to the SAS for further processing.

In a preferred embodiment of the invention the SS7 signaling server is further capable to receive a processed service request from the SAS, to include the processed service request into an outgoing SS7 message, and to transmit the outgoing message over an SS7 link.

In a preferred embodiment of the invention the at least one telecommunications unit of the SS7 signaling server is a mobile switching center (MSC).

The inventive method for routing SS7 links comprises the steps of:

identifying in a signaling transfer point (STP) a single application service request in an incoming SS7 message, providing the identified single application service request to a signaling application server (SAS), which is capable of processing at least one application service, and processing the provided service request in the SAS.

In a preferred embodiment of the invention the method further comprises the steps of:

providing the processed service request to the STP, including the processed service request into an outgoing SS7 message, and transmitting the outgoing message over an SS7 link.

In a further preferred embodiment of the invention the method further comprises the steps of:

identifying in the STP the single application service request out of a signaling connection control part (SCCP), identifying in the SAS an individual INAP or MAP service request out of the provided service request according to an internal application service id, and distributing in the SAS the identified INAP or MAP service request to a corresponding INAP or MAP service library.

Alternatively or in addtition to INAP or MAP, CAP, TCAP User Relay, TCAP Relay, or SCCP Relay service requests could be identified and distributed to a corresponding service library.

The inventive signaling transfer point (STP) for routing SS7 links comprises at least one processor and at least one processing software to process incoming SS7 messages, to identify a single application service request in the incoming SS7 message, and to provide the identified single application service request to a signaling application server (SAS) for further processing.

In a preferred embodiment of the invention the at least one processing software of the STP includes a SCCP Local User Escape process to identify a single application service request out of a signaling connection control part (SCCP).

In a further preferred embodiment of the invention the escape local user process is capable to receive processed single application service requests and to include the processed single application service requests into SCCPs, and the at least one processing software is capable to build up SS7 messages including the processed single application service requests and to transmit these SS7 messages over SS7 links.

The inventive signaling application server (SAS) comprises at least one processor and at least one processing software for processing at least one application service request, wherein the at least one processing software includes a signaling connection control part (SCCP) process and at least one transaction capabilities application part (TCAP) process to identify at least one application service request.

In a preferred embodiment of the invention one TCAP process of the SAS is capable to identify intelligent network application protocol (INAP) subsystem numbers (SSN) and another TCAP process is capable to process mobile application part (MAP) subsystem numbers (SSN).

In a further preferred embodiment of the invention an INAP service distributor process is provided to identify an individual INAP service request according to a service key and to distribute the identified INAP service request to a corresponding INAP service library, and an MAP service distributor process is provided to identify an individual MAP service request and to distribute the identified MAP service request to a corresponding MAP service library. The SAS services are addressed by an internal application service id; id=identification number.

In another preferred embodiment of the invention an SCCP relay process for the SAS is provided, and an SCCP relay distributor process for the SAS is provided to identify an individual SCCP relay request and to distribute the identified SCCP relay request to a corresponding SCCP relay library.

The inventive processing software for a signaling application server (SAS) to process at least two different application service requests includes a signaling connection control part (SCCP) process and at least one, advantageously at least two transaction capabilities application part (TCAP) processes to identify at least one, advantageously at least two different application service requests.

BRIEF DESCRIPTION OF THE DRAWINGS

For a better understanding of the present invention, reference is made to the accompanying drawings, in which:

FIG. 1 is a simplified block diagram of a portion of an exemplary telecommunications network, in particular a signaling server network architecture according to the teachings of the present invention;

FIG. 2 is a simplified block diagram of an exemplary SS7 signaling server according to the teachings of the present invention;

DETAILED DESCRIPTION OF THE INVENTION

Figure 3:
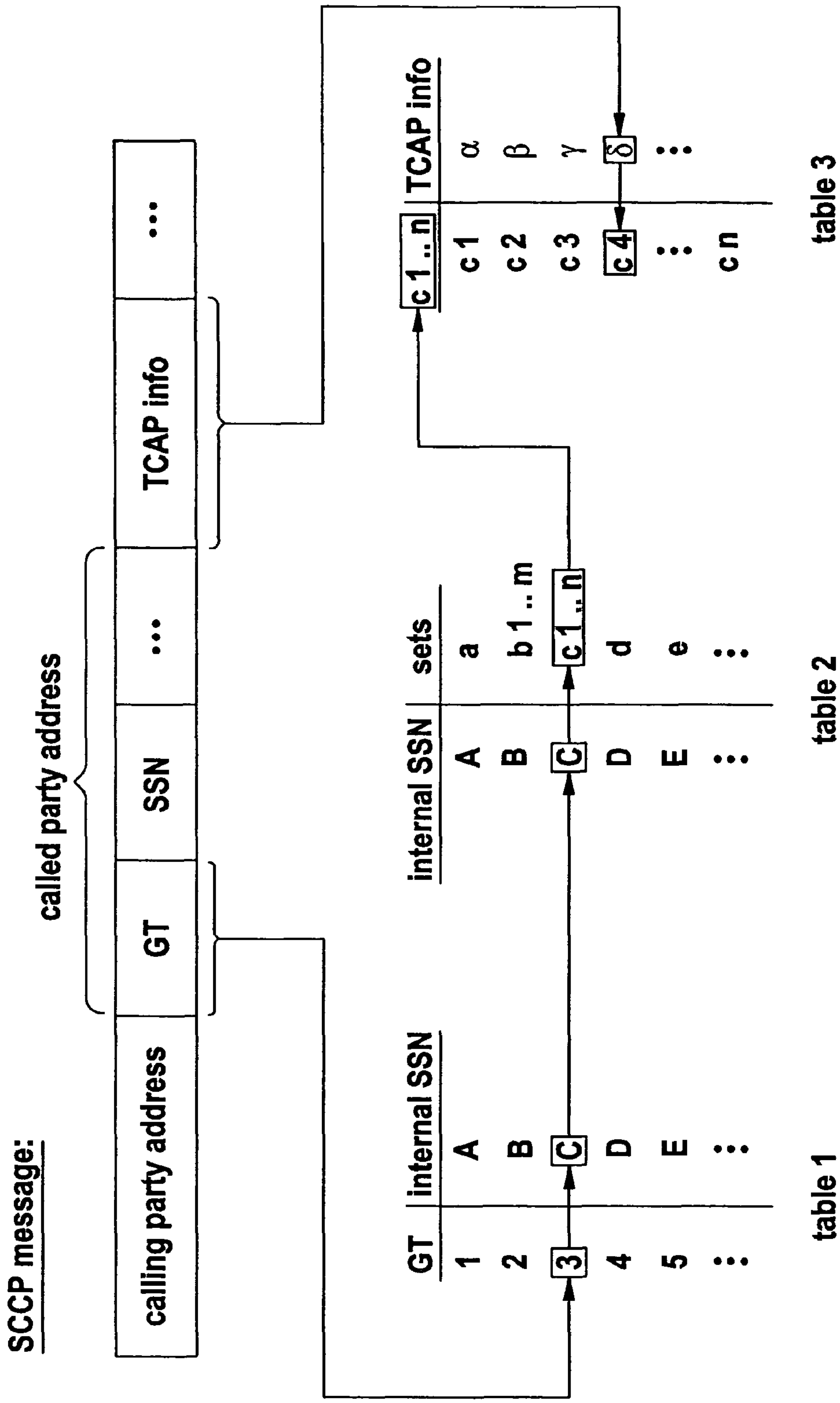
FIG. 3 is a simplified block diagram of an exemplary SCCP local user escape method implementation according to the teachings of the present invention.

The preferred embodiments of the present invention are illustrated in FIGS. 1–9, like reference numerals being used to refer to like and corresponding parts of the various drawings.

FIG. 1 shows a simplified block diagram of a portion of an exemplary telecommunications network according to the teachings of the present invention. The telecommunications network is, e.g., at least partly implemented like the telecommunications network according to FIG. 1 of U.S. Pat. No. 6,006,098 but not limited thereto, and the STP being, e.g., at least partly implemented like the STP according to FIG. 2 of U.S. Pat. No. 6,006,098 but not limited thereto.

The telecommunications network includes an inventive signaling server 1, which enables processing of different application services for fixed and/or mobile users independently from the topology of the network. The inventive SS7 signaling server 1 serves for routing SS7 links.

SS7 signaling server 1 is connected to at least one, advantageously at least two telecommunications units 2, 3, 4, 5, 6, 7. A telecommunications unit 2, 3, 4, 5, 6, 7 is e.g. implemented as a mobile switching center (MSC), a service control point (SCP), a service switching point (SSP) network nodes, a signalling gateway (SG), a media gateway controller (MGC), a fixed network switching unit, a PSTN switch, an IP switch, an IP gateway, a signaling transfer point (STP), another SS7 signaling server, etc. SS7 signaling server 1 includes at least two SS7 interfaces and is able to communicate with all telecommunications units, which have a SS7 interface.

SS7 includes the following SS7 protocol layers:

Message Transfer Part (MTP1, MTP2, and MTP3),

Signalling Connection Control Part (SCCP),

Transaction Capabilities Application Part (TCAP),

ISDN User Part (ISUP),

TCAP User Application Parts, e.g. MAP, INAP, CAP.

The functionality of the SS7 signaling server 1 is mainly implemented in software. The software is e.g. implemented in programming language C++. The software is installed on computers, e.g. UNIX work stations. The software may be sold or licensed in binary form with the object code or the source code, a hardware driver and end user documentation, e.g. as a complete package, or as individual layers.

Functions of the SS7 protocols are:

1. Trunk Signalling—the set up, maintenance and close down of voice circuits within the PSTN.
2. Number Look-up-access to network databases for call information (e.g. number translation, calling card record look-up, Local Number Portability (LNP) look-up IN/AIN services, Mobile Number Portability (MNP)).

More recently, SS7 has been used to provide signalling within IP networks to set up VoIP calls and even to manage calls which use a mix of PSTN and IP resources. By combining the SS7 and IP networks, services from one domain become available in the other (for example, Internet Call Waiting).

In some calls, the telephone number dialed by the caller may require translation before ISUP is able to identify the called party (for example, an 800 number must be translated into a physical telephone number). In some other cases, additional information may be passed with the called number (such as calling card number) that may have an effect on the processing of the call. In these cases, a protocol called TCAP is used by the calling party's SSP to access a network database which stores this information. Such a database is reached via an SCP node. In the case where a call involves an IP network (for example—the called party is using an IP phone) then the SS7 messages will pass through a Signalling Gateway to a Media Controller. The MCG uses the SS7 information to complete the call in the IP network.

MTP1, defines the physical characteristics of a link between two SS7 nodes (for example, bit rates, voltages, frame formats). It is the equivalent of layer 1 in the OSI seven layer model.

MTP2 is responsible for the reliable point-to-point transfer of messages between two SS7 nodes (across an MTP1 link). It is the equivalent of layer 2 in the OSI model.

MTP3 is responsible for passing messages through the SS7 network towards their destination. It deals with SS7 addressing, routing, load balancing, congestion control and the management of MTP2 links. MTP3 is roughly equivalent to layer 3 in the OSI model, though it locks the ability to make end-to-end connections.

SCCP provides a logical end-to-end service over MTP3, essentially giving a full OSI layer 4 service. This service may be connectionless or connection oriented. SCCP also provides fragmentation/reassembly, guaranteed in-sequence delivery, flow control and service availability management.

TCAP is a command-response and query-reply based protocol which provides access to remote network databases (housed in SCP nodes). It spans layers 4 to 7 in the OSI model.

ISUP is the trunk signaling protocol. It governs access to and use of the voice circuits within the PSTN. It is the equivalent of layer 4 in the OSI model.

SS7 signaling server 1 advantageously conforms to one or more of the following standards:

MTP1-ANSI T1.111, GR-246-CORE, ITU-T Recommendation Q.702,

MTP2-ANSI T1.111, GR-246-CORE, ITU-T Recommendation Q.703,

MTP3-ANSI T1.111, GR-246-CORE, ITU-T Recommendation Q.704,

SCCP-ANSI T1.112, GR-246-CORE, ITU-T Recommendation Q.712, Q.713, Q.714,

TCAP-ANSI T1.114, ITU-T Recommendation Q.771, Q.772, Q.773, Q.774,

ISUP-ANSI T1.113, ITU-T Recommendation Q.761, Q.762, Q.763, Q.764,

MAP, CAP, and/or INAP according to ANSI, ITU, and/or ETSI.

The Signalling Server 1 is capable of doing the following:

- Traditional routing of the SS7 messages based on MTP and SCCP addressing information.
- Routing and modification of SS7 Signalling Messages based on MTP or SCCP information requiring an intelligent service logic and/or a lookup in a large database.
- Routing, modification and termination of SS7 Signalling Messages based on information in TCAP and in TCAP users.
- Routing, modification and termination of SS7 Signalling Messages based on MTP users other than SCCP, e.g. ISUP, etc.
- Routing, modification and termination of SS7 Signalling Messages in a NGN (next generation network) environment.

FIG. 2 is a simplified block diagram of an exemplary SS7 signaling server according to the teachings of the present invention and corresponding to the SS7 signaling server of FIG. 1.

The inventive SS7 signaling server 1 for routing SS7 links, includes a signaling transfer point (STP) and a signaling application server (SAS). STP and SAS have different functionalities. The STP has at least one external interface to connect the STP via at least one SS7 link to at least one telecommunications unit, and an internal interface to connect the STP to the SAS. The STP processes incoming SS7 messages, e.g. in the MTP1, MTP2, MTP3, and SCCP layer. The SAS is capable to process at least one, advantageously at least two different application service requests. The STP identifies a single application service request in one incoming SS7 message and provides the identified single application service request to the SAS for further processing. The SAS has e.g. two TCAP processes to identify two different application services, e.g. INAP and MAP. STP and SAS are interconnected via an internal interworking protocol, e.g. using TCP/IP (transmission control protocol/internet protocol).

STP includes: Traditional STP functionality plus new escape method(s) to the SAS plus ASTP (Advanced Signalling Transport Protocol).

SAS includes: Server bank in high-availability and load-sharing mode with large DBMS and intelligent service logic for Advanced Signalling Services;

DBMS=Database Management System.

SS7 signaling server 1 is advantageously connected to a SPS and a CMC via e.g. an IP network.

SPS (Service Provisioning System) includes: Configuration Management system for SAS.

CMC (Convergent Management Centre) includes: Management System for STP and SAS, except SPS functionality.

Preferably the SS7 signaling server 1 is further capable to receive a processed service request from the SAS, to include the processed service request into an outgoing SS7 message, and to transmit the outgoing message over an SS7 link.

The inventive signaling transfer point (STP) for routing SS7 links comprises at least one processor and at least one processing software to process incoming SS7 messages, to identify a single application service request in the incoming SS7 message, and to provide the identified single application service request to a signaling application server (SAS) for further processing. Further usual elements like memory, etc. are known by the man skilled in the art.

FIG. 3 is a simplified block diagram of an exemplary SCCP local user escape method implementation according to the teachings of the present invention.

The at least one processing software of the STP includes an SCCP local user escape process to identify a single application service request out of a signaling connection control part (SCCP). Other escape methods/processes are possible.

In a preferred embodiment of the invention the SCCP local user escape process is capable to receive processed single application service requests and to include the processed single application service requests into SCCPs, and the at least one processing software is capable to build up SS7 messages including the processed single application service requests and to transmit these SS7 messages over SS7 links.

In the following two alternatives for the SCCP local user escape process are described:

In a first alternative a computer program (=software) for escaping a signaling transfer point (STP) signaling connection control part (SCCP) and for identifying a single application service request, comprises the steps of:

mapping an incoming global title (GT) of an incoming SS7 message to an internal subsystem number (SSN) of a local user, mapping the internal SSN to a set of application service requests, identifying a single application service request using transaction capabilities application part (TCAP) filter mechanism.

The computer program advantageously performs mapping using online configurable tables. The content may be changed during operation and adapted to the run-time. Database tables will be reconfigured using configuration files. Tables could be cascaded, thus minimizing storage place and enabling direct access via concatenated links.

The computer program may be stored on a storage medium like e.g. a compact disk. The storage medium including the computer program or the computer program as such will be sold or leased to customers. The computer program will be installed on the STP, who has a processor to access and execute the computer program.

FIG. 3 includes a SCCP message frame and three tables table 1, table 2, table 3. The SCCP message frame includes a first part including the calling party address, a second part including the called party address, a third part including TCAP information TCAP info, and a fourth part including further information.

The called party address includes a global title (GT), a subsystem number (SSN) and further information.

Table 1 includes a large number of different global titles 1, 2, 3, 4, 5, . . . and corresponding internal SSNs A, B, C, D, E, . . . . The number of global titles could have an amount of up to 200.000 elements. The GTs and the SSNs may be encoded using internal GT or SSN ids, respectively; id=identification number, each id having e.g. one or two or more bytes.

Table 2 includes a large number of internal SSNs A, B, C, D, E, . . . and corresponding sets of application service requests a, b1..m, c1..n, d, e; m being a number between e.g. 2 and 20, n being a number between e.g. 2 and 30. The number of SSNs could have an amount of up to 200.000 elements. The application service requests may be encoded using internal application service ids; id=identification number, each id having e.g. one or two or more bytes.

Table 3 includes a number of application service requests c1, c2, c3, c4, . . . , cn corresponding to the set c1..n of the set of application service requests a, b1..m, c1..n, d, e of table 2 and corresponding TCAP info $\alpha$, $\beta$, $\chi$, $\delta$, . . . . The TCAP info may be encoded using internal TCAP ids; id=identification number, each id having e.g. one or two or more bytes. The TCAP info may correspond to the TCAP info of a SCCP message or to part of it.

A table 4 (not shown in FIG. 3) exists including a number of application service requests corresponding to the set b1..m of the set of application service requests a, b1..m, c1..n, d, e of table 2 and corresponding TCAP info.

One set of table 2 corresponds either to one single application service request (case a, d, e) or to a plurality of application service requests (case b1..m and c1..n). For each set corresponding to a plurality of application service requests one single table exists.

In the example of FIG. 3 the GT of the called party address of the incoming SCCP message frame is mapped to table 1, e.g. the incoming GT corresponds to 3, so it is mapped to 3. The computer program searches 3 and looks up the corresponding internal SSN, which is C in this case. Subsequently the computer program uses the result of table 1 (internal SSN=C) and maps it to a set of application service requests using table 2. The computer program searches C and looks up the corresponding set, which is c1..n in this case. Subsequently the computer program uses the result of table 2 (set=c1..n) and identifys a single application service request using the TCAP info. The computer program chooses the corresponding table, which is table 3 for set c1..n, and maps the TCAP info or at least part of it to the TCAP info of table 3, which is in this $\delta$ case. The computer program searches $\delta$ and looks up the corresponding single application service request, which is c4 in this case. Thus, single application service request c4 is identified.

In a second alternative (not shown in FIG. 3) a computer program (=software) for escaping a signaling transfer point (STP) signaling connection control part (SCCP) and for identifying a single application service, comprises the steps of:

routing an incoming SS7 message to an internal subsystem number (SSN) of a local user based on an incoming subsystem number (SSN), mapping the internal SSN to a set of application service requests, identifying a single application service request using transaction capabilities application part (TCAP) filter mechanism.

The computer program advantageously performs mapping and routing using online configurable tables. The advantage of the second alternative is that only two tables (corresponding to table 2 and 3 of FIG. 3) are sufficient for the implementation.

In order for these two alternatives to work the incoming SS7 message has to fulfil one of the following two requirements:

a. The SCCP Routing Indicator is set to Route on Global Title and the Global Title Translation process of the STP maps the Global Title (GT) of the incoming SS7 message to an internal Sub-System Number (SSN), which identifies a local user in the STP.

b. The SCCP Routing Indicator is set to Route on Point Code and SSN, and the SSN in the SCCP address information identifies a local user of the STP.

This local SCCP user is a Generic Local User, which receives all SCCP messages, which are to be routed to the SAS. I.e. all internal SSNs and all external SSNs, which identify a SAS Application Service, address this generic local user in the SSE Core. In both cases a) and b) the received SCCP message is forwarded to the SAS.

In case a) the internal SSN corresponds to a set of SAS Application Services. In many cases this set contains only one element, which implies that a unique SAS Application Service can be identified. In cases where this set contains more than one element, additional analysis has to be done. This analysis involves information, which is available in the TCAP layer and includes but is not limited to: TCAP User Operation Code, TCAP Dialogue Primitive Code, TCAP Component Primitive Code, TCAP User Protocol Version, Application Context, etc. On the basis of this information, a unique SAS Application Service can be identified. This process is called TCAP Based Filtering and Analysis.

In case b) the external SSN identifies in general exactly one SAS Application Service. It might, however, also be possible that a set of SAS Application Services is identified by a single external SSN. In this case, the TCAP Based Filtering and Analysis of case a) has to be applied.

In a third alternative (not shown in FIG. 3) a computer program for escaping a signaling transfer point (STP) signaling connection control part (SCCP) and for identifying a single application service request, comprising the steps of:

mapping an incoming global title (GT) of an incoming SS7 message to an internal subsystem number (SSN) of a local user or routing an incoming SS7 message to an internal subsystem number (SSN) of a local user based on an incoming subsystem number (SSN), and mapping the internal SSN to a corresponding single application service request stored in a table including SSNs and corresponding single application service requests.

The advantage of the third alternative is that only one table (corresponding to table 2 of FIG. 3) is sufficient for the implementation.

The generic local user in the SSE Core is capable to correctly handle the following types of TCAP and SCCP Interactions:

TCAP User Terminating Dialogue: the TCAP dialogue originates in the SS7 network external to the SS7 signaling server and is terminated in the TCAP user within the SAS. Long or short dialogues are possible. Information in the TCAP user message and address information in SCCP may be modified. A TC-BEGIN or TC-UNI enters the TCAP user in the SAS and a TC-CONTINUE, TC-END or TC-ABORT exits the TCAP user in the SAS. For long dialogues a TC-CONTINUE or TC-END may enter the TCAP user in the SAS.

TCAP User Relay Dialogue: the TCAP dialogue originates in the SS7 network external to the SS7 signaling server and is forwarded by the TCAP user within the SAS. Information in the TCAP user message and address information in SCCP may be modified. A TC-BEGIN or TC-UNI enters the TCAP user in the SAS and a TC-BEGIN or TC-UNI, respectively, exits the TCAP user in the SAS. The distinction whether TCAP User Terminating Dialogue or TCAP User Relay Dialogue applies is done in the TCAP user service in the SAS.

TCAP Relay Dialogue: the TCAP dialogue originates in the SS7 network external to the SS7 signaling server and is forwarded by the TCAP and Service Distributor layer within the SAS. Address information in SCCP may be modified. A TC-BEGIN or TC-UNI enters the TCAP and Service Distributor layer in the SAS and a TC-BEGIN or TC-UNI, respectively, exits the TCAP and Service Distributor layer in the SAS. The decision to relay the TCAP dialogue or to forward it to the TCAP user is done in the TCAP and Service Distributor layer.

SAS originated Dialogue: the TCAP dialogue originates in a SAS application service. TC-BEGIN or TC-UNI exits the SAS application service.

SCCP Relay: a SCCP message from the outside SS7 network is received in the SCCP Relay Service, SCCP addressing information may be modified, and the SCCP message is sent back to the SS7 network external to the SS7 signaling server. A particular SCCP Relay Service can, however, discover that the SCCP message is to be terminated by a TCAP user.

On the way back from the SAS to the STP, the STP has to correctly insert the SCCP message into the external SS7 message stream. The above two cases a) and b) have to be distinguished:

a. If the SS7 message had the Routing Indicator set to Routing on GT, then outbound a second Global Title Translation is necessary.

b. If the SS7 message had the Routing Indicator set to Routing on Point Code and SSN, then returned SS7 message is also routed on Point Code and SSN.

SS7 Message Segmentation in combination with the adjunct SAS is handled in the following way (UDT=Unite Data, UDTS=UDT service, LUDT=Long UDT, XUDT=Extended UDT):

UDT/UDTS messages are interchanged between the STP and the SAS as they are.

Segmented XUDT/XUDTS messages are re-assembled in the STP and sent as a single LUDT/LUDTS message to the SAS. The SAS returns a single LUDT/LUDTS message to the STP, and the STP segments this message into XUDT/XUDTS messages.

Segmented LUDT/LUDTS messages are re-assembled in the STP and sent as a single internal Super LUDT/LUDTS message to the SAS. The SAS returns a single Super LUDT/LUDTS message to the STP, and the STP segments this message into XUDT/XUDTS messages.

Figure 4:
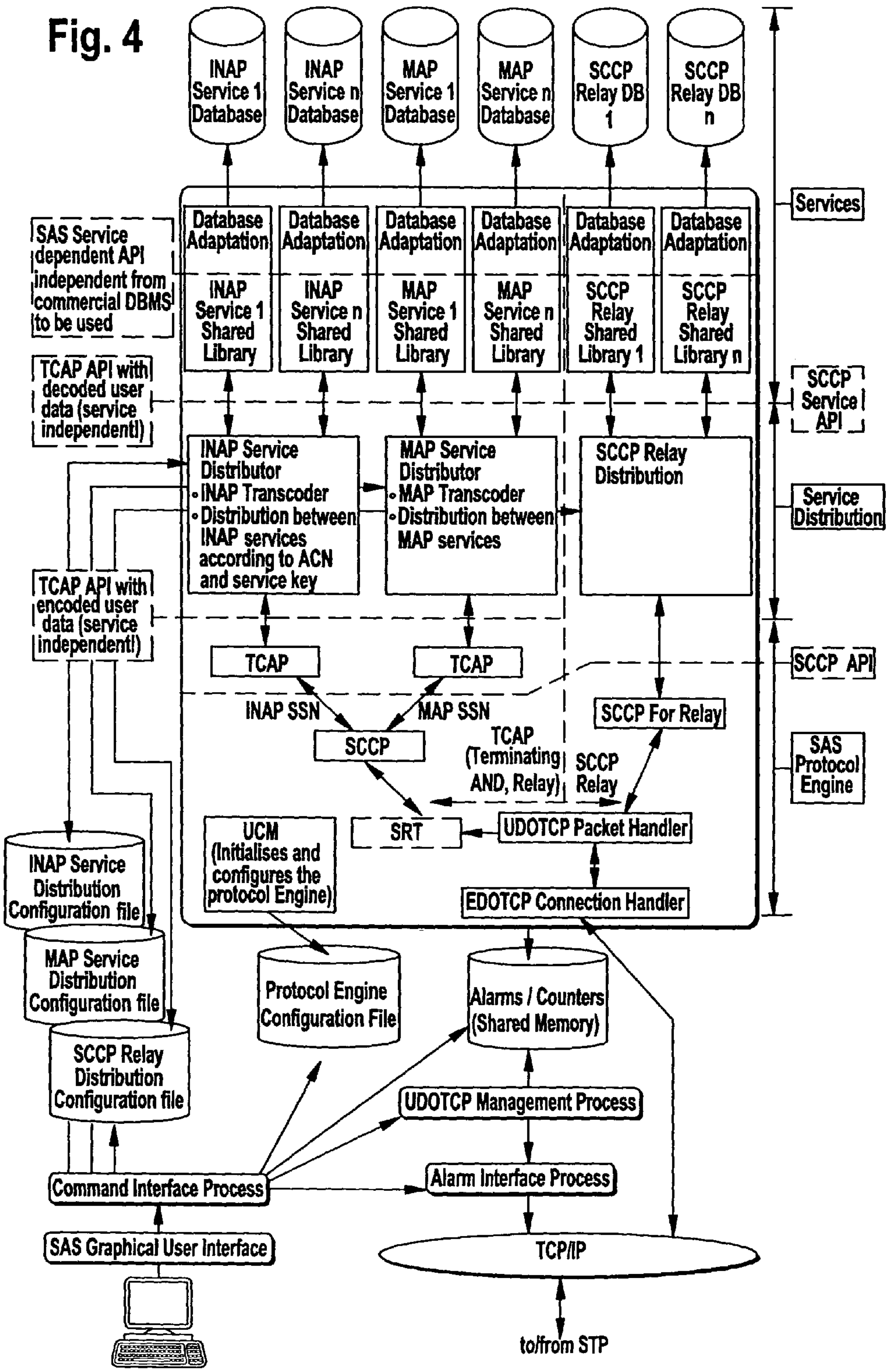
FIG. 4 is a simplified block diagram of an exemplary signaling application server (SAS), in particular a SAS software architecture according to the teachings of the present invention.

FIG. 4 is a simplified block diagram of an exemplary signaling application server (SAS) according to the teachings of the present invention.

The inventive signaling application server (SAS), comprises at least one processor and at least one processing software for processing at least one, advantageously at least two different application service requests, wherein the at least one processing software includes a signaling connection control part (SCCP) process and at least one, advantageously at least two transaction capabilities application part (TCAP) processes to identify at least one, advantagepously at least two different application service requests. Further usual elements like memory, etc. are known by the man skilled in the art.

In a preferred embodiment of the invention one TCAP process of the SAS is capable to identify intelligent network application protocol (INAP) subsystem numbers (SSN) and another TCAP of the SAS process is capable to process mobile application part (MAP) subsystem numbers (SSN).

In a further preferred embodiment of the invention an INAP service distributor process for the SAS is provided to identify an individual INAP service request according to a service key and to distribute the identified INAP service request to a corresponding INAP service library, and an MAP service distributor process for the SAS is provided to identify an individual MAP service request and to distribute the identified MAP service request to a corresponding MAP service library.

In another preferred embodiment of the invention a SCCP relay process for the SAS is provided, and a SCCP relay distributor process for the SAS is provided to identify an individual SCCP relay request and to distribute the identified SCCP relay request to a corresponding SCCP relay library.

The inventive processing software for the SAS to process at least two different application service requests, includes a SCCP process and at least two TCAP processes to identify at least two different application service requests.

The SAS includes at least one SAS process and environmental equipment.

Each SAS process is subdivided into three parts: SAS protocol engine, service distribution, services, plus SAS database.

The SAS protocol engine serves to adapt protocols and to pick out TCAP terminating and relay services on the one side and SCCP relay services on the other side. The picking out of the services is perfomed using SCCP processes. In addition, INAP and MAP services are picked out. This is performed using TCAP processes. One SCCP process for TCAP is connected to the TCAP processes via a SCCP API. The two TCAP processes and the SCCP process for relay are connected to the service distribution via two TCAP APIs with encoded user data (service independent) and a SCCP API, respectively.

The service distribution serves to distribute the received application services requests among individual service libraries. The INAP service distributor process includes an INAP transcoder and performs distribution between INAP services according to ACN and service keys. The MAP service distribution process includes a MAP transcoder and performs distribution between MAP services. The service distribution is connected to services via TCAP APIs with decoded user data (service independent) in case of INAP and MAP device distribution and SCCP service APIs in case of SCCP relay distribution.

The distribution is mainly done on the basis of the internal application service id transported in the ASTP Header. The selection of the specific TCAP user protocol version is based on the Application Context.

Services serves to access individual service databases to process the single application service requests. Services includes INAP service libraries, MAP service libraries and SCCP relay libraries and corresponding databases. The access to the databases is performed using SAS service dependent APIs and database adaptations. Services could in addition also include e.g. CAP service libraries and corresponding databases.

The environmental equipment serves to configure the distribution processes. Three configuration files are used to configure the distribution processes: INAP service distribution configuration file, MAP service distribution configuration file, SCCP relay distribution configuration file. Via a SAS graphical user interface access to the configuration files is enabled.

The environmental equipment serves in addition to perform protocol adaptation and alarm management. The interface to STP is TCP/IP. A TCP/IP process filters specific contents out of a received TCP/IP packet and forwards them to the SAS process(es). Specific contents received from the SAS process(es) are included into TCP/IP packets and transmitted to the STP.

Figure 5:
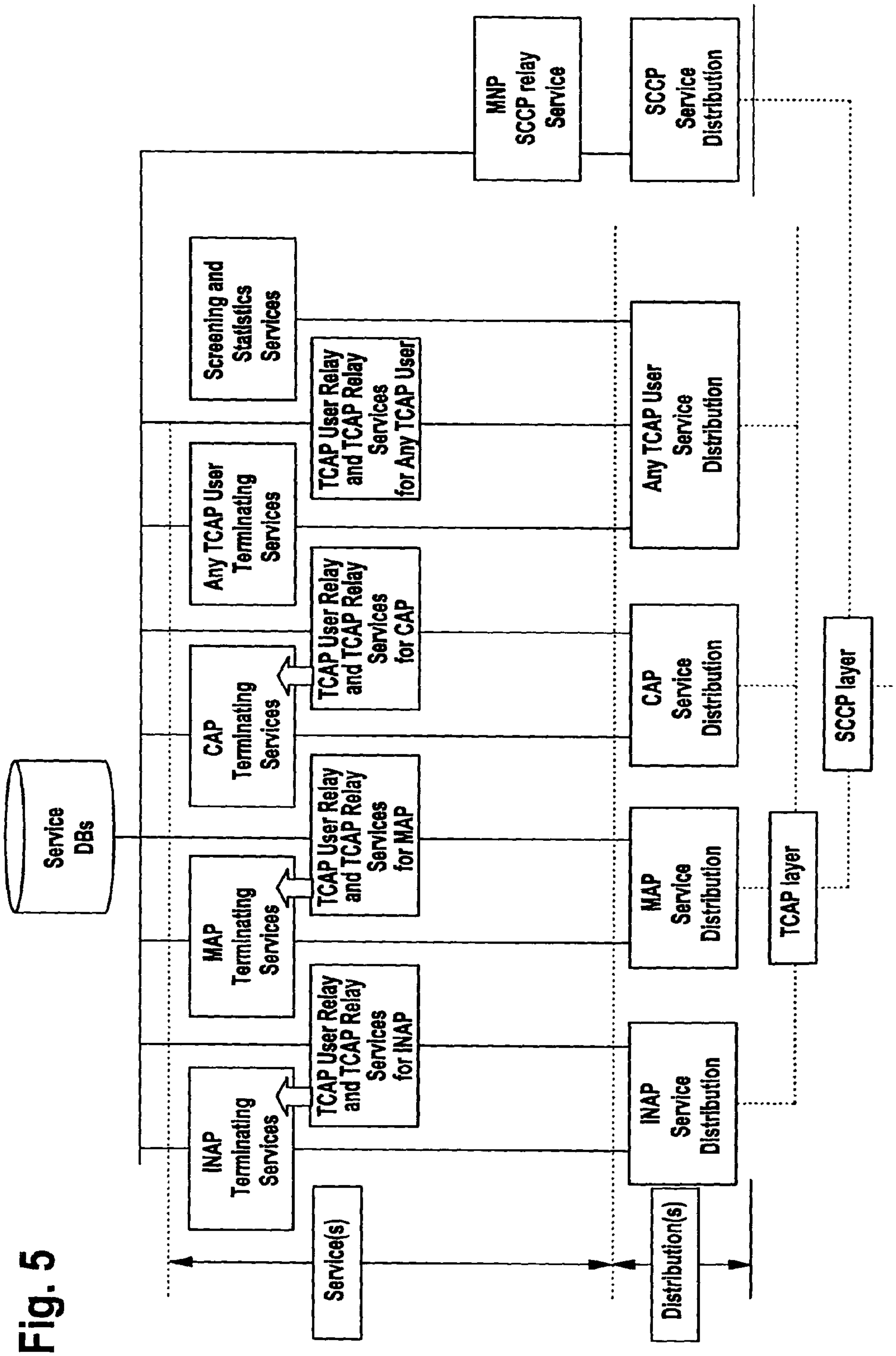
FIG. 5 is a simplified block diagram of another exemplary signaling application server (SAS), in particular a SAS service architecture according to the teachings of the present invention.

FIG. 5 is a simplified block diagram of another exemplary signaling application server (SAS). The block diagram shows the logical and service structure for services, e.g. number portability services of the SAS.

Number portability is a facility provided by one operator to another, which enables customers to keep their telephone numbers when switching their business between those operators.

The feature is possible for fixed and mobile networks.

With the introduction of Mobile Number Portability (MNP), a mobile subscriber is allowed to change subscription networks while retaining their original number. The relationship between the mobile subscriber number and the number range from which the number has been allocated is no longer a static relationship. The number does no longer identify the subscription network for the mobile subscriber.

The new requested mapping between the mobile number and the subscription network is done via a MNP database (DB) which delivers additional routing information in order to guarantee the correct routing between different providers.

The requests to the MNP DB are done with different mechanisms. Via the Signalling System Number 7 (N7) possibilities are as for Intelligent Networks (IN) with the Intelligent Network Application Protocol (INAP) or with the Mobile Application Part (MAP) and the CAMEL Application Part (CAP); CAMEL=Customized Application for Mobile network Enhanced Logic.

Due to features (e.g. Call Completion to Busy Subscriber (CCBS)) and other circumstances (e.g. prepaid processing) also on Signalling Connection Control Part (SCCP) address level addresses must be changed via MNP database queries by relaying the appropriate messages. Something similar is necessary for the Transaction Capability Application Part (TCAP) with optional data changes on user level.

FIG. 5 gives a Top Level Design (TLD) overview about the SAS Services, e.g. MNP Services and their Service Distributions.

The MNP Services use data contained within the INAP, MAP, CAP and SCCP protocol layer to interrogate the MNP DB and to return back a porting result to the originator or to relay the request. The interfaces, functions and features of the Service Distributions and mainly the MNP Services are described in the following.

The MNP DB contains route specific data on a subscriber by subscriber basis.

Service Structure:

The Service functionality for each single Service is always divided in two parts for all Services. The Service Distribution and the Service itself.

Service Distribution(s):

The Service Distributions are protocol dependent and responsible for the decoding and encoding of the service relevant messages/operations. Furthermore they guarantee the selection of the correct Service which can handle the request/dialogue.

The selection of the correct Service Distribution is controlled by message filtering and SSN checks on instances before.

The Service Distributions on top of the different protocol stocks (here: TCAP and SCCP) are shored libraries which are linked during initialisation according to configuration data.

The identified MNP Service Distributions are:

the INAP Service Distribution the MAP Service Distribution the CAP Service Distribution the SCCP Service Distribution The selection of the final Service is done via:

the ApplicationInfo (incl. internal application service id and TCAP Filter Result)

if necessary on any other information available in TCAP and TCAP user.

Service(s):

Each Service handles a well defined functionality and uses in case of common activities classes of a Service Class pool. The Service represents the logic for an outlined functionality.

The Services on top of one or different Service Distributions are shared libraries, which are linked during initialisation according to configuration data of the Service Distribution(s).

Each Service has service specific configuration files (dependent on protocol and service) together with a common one which is valid for all MNP Services.

The identified categories of MNP Services are:

the MNP INAP Service(s)

the MNP MAP Service(s)

the MNP CAP Service(s)

the MNP SCCP relay Service(s)

the MNP TCAP user relay Service(s) for INAP the MNP TCAP user relay Service(s) for MAP the MNP TCAP user relay Service(s) for CAP The first three Services are TCAP User Terminating Dialogues, the last three ones are acting as TCAP user Relay or pure TCAP Relay.

MNP INAP Service(s):

A MNP INAP Service resides on top of the INAP Service Distribution and is responsible to handle all defined requirements on INAP layer level and to interrogate the appropriate MNP DB parts.

The INAP Service is used for call related messages and is dialogue oriented.

Usage:

Standard MNP request if it is not done via MAP (call related).

MNP MAP Service(s):

A MNP MAP Service resides on top of the MAP Service Distribution and is responsible to handle all requested requirements on MAP layer level and to interrogate the appropriate MNP DB parts.

The MAP Service is used for call related messages and is dialogue oriented.

Usage:

Standard MNP request if it is not done via INAP (call related).

MNP CAP Service(s):

A MNP CAP Service resides on top of the CAP Service Distribution and is responsible to handle all requested requirements on CAP layer level and to interrogate the appropriate MNP DB parts.

The CAP Service is used for call related messages and is dialogue oriented.

MNP SCCP relay Service(s):

A MNP SCCP relay Service resides on top of the SCCP Service Distribution and is responsible to handle all requested requirements on SCCP layer level and to interrogate the appropriate MNP DB parts.

The SCCP relay Service is used for non-call related routing of messages by relaying them on SCCP level.

Usage:

Standard MNP handling for involved mobile features like CCBS (non-call related).

MNP TCAP user relay Service(s) for INAP:

A MNP TCAP relay Service for INAP resides on top of the INAP Service Distribution and is responsible to handle all requested requirements on INAP layer level and to interrogate the appropriate MNP DB parts.

The TCAP user relay Service for INAP is used for call related routing of messages by relaying them on TCAP level. Dependent on the implemented logic, changes on INAP user data level are optional.

Under implementation aspects the Service can be an integrated part of a MNP INAP Service.

Usage:

Support of Prepaid processing and Service Number Portability.

MNP TCAP user relay Service(s) for MAP:

A MNP TCAP relay Service for MAP resides on top of the MAP Service Distribution and is responsible to handle all requested requirements on MAP layer level and to interrogate the appropriate MNP DB parts.

The TCAP user relay Service for MAP is used for call related routing of messages by relaying them on TCAP level. Dependent on the implemented logic, changes on MAP user data level are optional.

Under implementation aspects the Service can be an integrated part of a MNP MAP Service.

MNP TCAP user relay Service(s) for CAP:

A MNP TCAP relay Service for CAP resides on top of the CAP Service Distribution and is responsible to handle all requested requirements on CAP layer level and to interrogate the appropriate MNP DB parts.

The TCAP user relay Service for CAP is used for call related routing of messages by relaying them on TCAP level. Dependent on the implemented logic, changes on CAP user data level are optional.

Under implementation aspects the Service can be an integrated part of a MNP CAP Service.

Usage:

Support of Prepaid processing.

Concrete Services for MNP which are Supported by the SAS of FIG. 4:

Standard Mobile Number Portability Service for INAP.

Mobile Number Portability Service for INAP including Voice Mail Interworking.

Mobile Number Portability Service for INAP including Interworking (here: TCAP user relay).

Standard Mobile Number Portability Service for MAP (terminating function).

Mobile Number Portability Service for MAP including Voice Mail Interworking.

Mobile Number Portability Service for MAP including SRI for Short Message Service.

Mobile Number Portability Service for MAP including Forward Short Message.

Mobile Number Portability Service for MAP including Any Time Interrogation.

Service is counterpart of MNP-MATF/SRF-ATI SCCP Relay Service.

Mobile Number Portability Service for CAP including Interworking (here: TCAP user relay).

Mobile Number Portability Service for Non Call Related messages on SCCP level.

Standard Mobile Number Portability Service for MAP (relay function).

Mobile Number Portability SCCP relay Service including Voice Mail Interworking.

Mobile Number Portability SCCP relay Service including SRI for Short Message Service.

Mobile Number Portability SCCP relay Service including Forward Short Message.

Mobile Number Portability SCCP relay Service including Any Time Interrogation.

An implementation of an inventive SAS according to the invention may support one or more of the concrete services of the SAS of FIG. 4.

Figure 6:
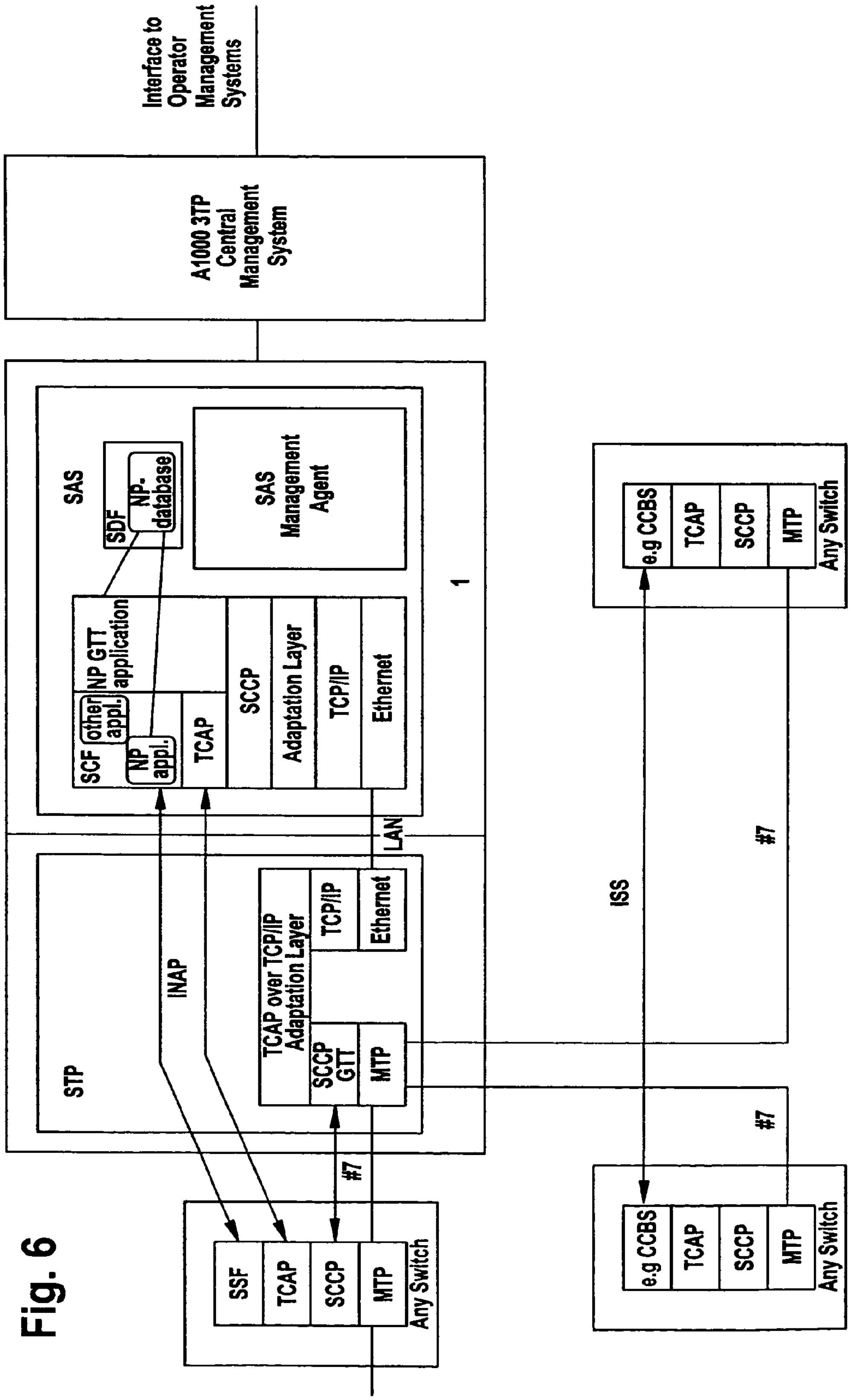
FIG. 6 is a simplified block diagram of another exemplary network including a SAS (FNP interworking scenario) according to the teachings of the present invention.

FIG. 6 is a simplified block diagram of another exemplary network including a SAS. The block diagram shows a logical network configuration including STP, SAS, a central management system, and three switches.

The SAS is used for fixed number portability (FNP) services.

The internal layer structure is shown. Between the SSF (service switching function) in a remote switch and the SCF (service control function) in the SAS the INAP (intelligent network application protocol) protocol is used. Between the TCAP in the remote exchange and the TCAP in the SAS exsists a peer-to-peer communication, this applies also for the SCCP layer in the remote exchange and the STP.

Between the CCBS (completion of call to busy subscriber) applications in the remote exchanges exists an end-to-end dialogue via ISS (ISDN supplementary services (subsystem number)).

Internally in the SAS the SCF and the NP GTT application hove an interface to the SDF (service data function); NP=number portability, GTT=global title translation.

In the STP the SCCP interface to TCP/IP is part of the adaptation layer. The SCCP functionality in the adaptation layer supports connectionless services and protocol class 0 and 1.

The transport system between the STP and the SAS shall be TCP/IP over Ethernet. A SAS shall include one or more SAS-servers. Each SAS server shall have one or two IP addresses, depending on dimensioning and high-availability requirements.

The SAS of shall offer a homogenous solution for the following types of Number Portability in the Fixed Network:

Location Portability.

Service Provider Portability for Geographic Numbers.

Service Provider Portability for non-Geographic Numbers.

Service Portability.

An concatenation of above Number Portability types.

This homogenous solution shall interoperate with any switch in the operator's network which is required to interoperate, independently of the vendor of those switches.

The SAS FNP solution shall apply to Number Portability within a given numbering area, i.e. an area with the same area-specific prefix.

FNP in the SAS shall work correctly, no matter whether it is located in the Originating Network, Donor Network, Recipient Network, or Transit Network. FNP in the SAS shall work correctly, no matter whether the number is ported in or ported out.

FNP in the SAS shall work correctly, no matter which subscriber type is involved, e.g. analogue, digital, PABX, VPN, etc.

FNP in the SAS shall work correctly, no matter which FNP method is used in the network, e.g. Onward Routing with IN Trigger, Query on Release, All Call Query.

FNP in the SAS shall be able to interact with Supplementary Services, IN-based Services, Carrier Selection, Statistical Counters Collection.

The Central Management System shall be able to support the following transport mechanisms towards the operator's management facilities:

TCP/IP.

FTP (file transfer protocol).

CORBA (common object request broker architecture).

Figure 7:
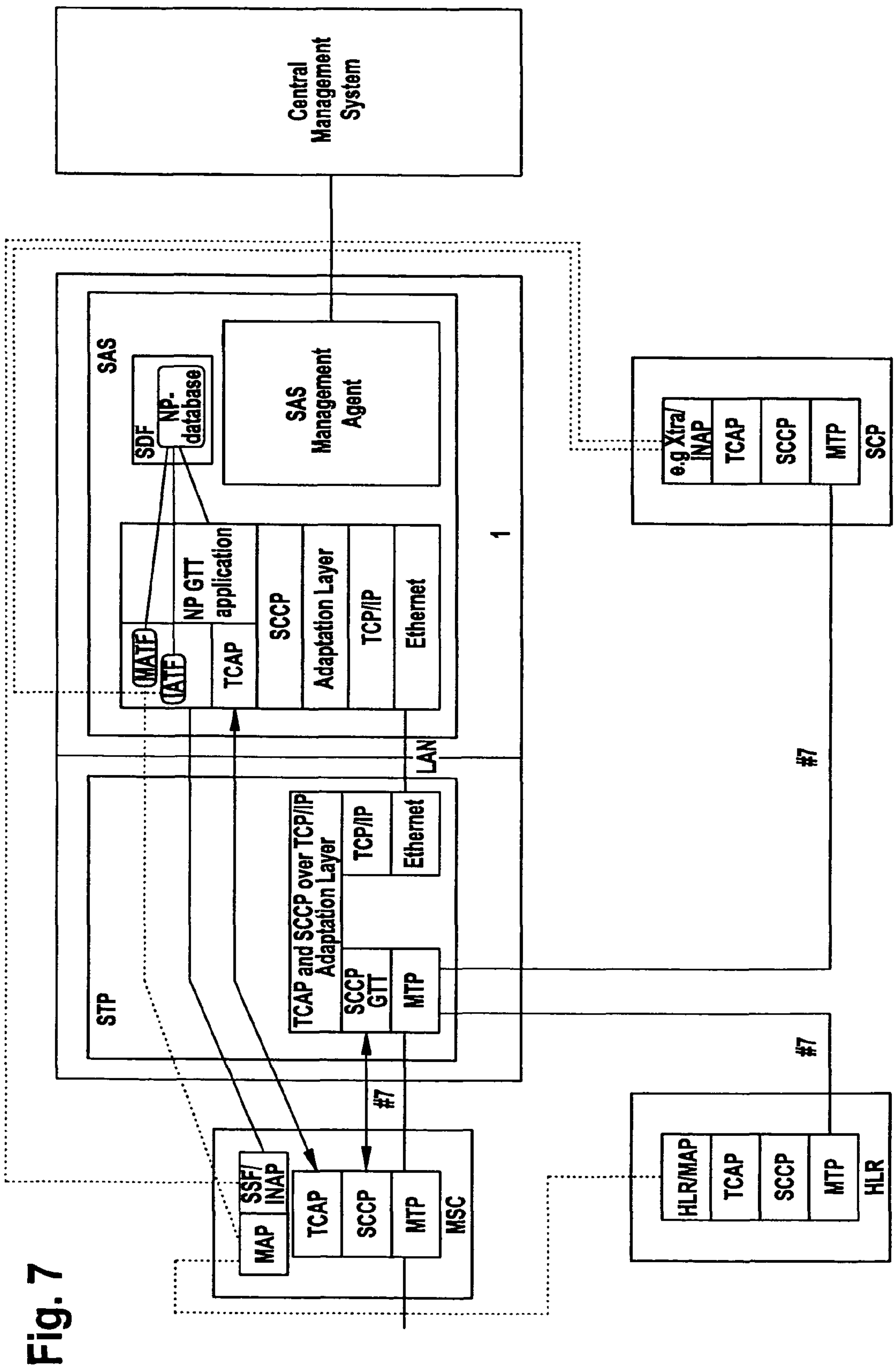
FIG. 7 is a simplified block diagram of another exemplary network including a SAS (MNP interworking scenario) according to the teachings of the present invention.

FIG. 7 is a simplified block diagram of another exemplary network including a SAS. The block diagram shows a logical network configuration including STP, SAS, MSC, HLR, SCP, and a central management system.

The SAS is used for mobile number portability (MNP) services.

The internal layer structure is shown. Between the MAP application in a remote MSC and the MATF (MAP application termination function) application in the SAS the MAP protocol is used. Between the SSF in a remote MSC and the IATF (INAP application termination function) in the SAS the INAP protocol is used. Between the TCAP in the remote exchange and the TCAP in the SAS exsists a peer-to-peer communication, this applies also for the SCCP layer in the remote exchange and the STP.

Between the MAP application in the remote MSC and the HLR (home location register) the MAP protocol is used. Between the INAP application in the remote SCP and the IATF application in the SAS the INAP protocol is used. Also, between the INAP application in the remote SCP and the SSF application in the remote MSC the INAP protocol is used.

Internally in the SAS the SCF and the NP GTT application have an interface to the SDF.

In the STP the SCCP interface to TCP/IP is part of the adaptation layer. The SCCP functionality in the adaptation layer supports connectionless services and protocol class 0 and 1.

The transport system between the STP and the SAS shall be TCP/IP over Ethernet. A SAS shall include one or more SAS-servers. Each SAS server shall have one or two IP addresses, depending on dimensioning and high-availability requirements.

Interface Requirements Applying to both FIG. 6 and FIG. 7:

General:

Each application part of the SAS shall be able to communicate via INAP, MAP or any other TCAP user with another application part in a node reachable from the STP via the signalling system No.7 network. For this purpose, the SAS shall use the STP/SRP functionality of the STP and shall access this STP functionality via TCP/IP over Ethernet; SRP=signaling relay point. The communication architecture of the SAS shall be sufficiently extendable in order to allow e.g. the replacement of TCP with UDP for the purpose of improving speed.

Both TCAP and SCCP shall be able to be transported over TCP. This involves a TCAP-over-TCP adaptation layer and a SCCP-over-TCP adaptation layer.

The STP shall know all SAS servers in the operator network to be able to use remote SAS servers if the local SAS servers cannot carry the offered load.

This overload condition may be caused by an unavailability of one or more SAS servers or by an unexpectedly high overload condition.

The STP shall use as the preferred SAS servers the locally connected SAS.

The STP shall transfer traffic to remote SAS servers in case of an unexpected overload condition and/or unavailability of one or more SAS servers.

TCAP over TCP/IP:

In order to transport TCAP over TCP there shall be an adaption layer between TCAP and TCP in the STP and in the SAS. This adaption layer shall offer a SCCP connectionless service interface to TCAP, control the underlying TCP communication (initialisation, release, overload control, error recovery) and communicate the TCAP PDUs via TCP/IP. All TCAP dialogue packets shall be accompanied by an SCCP header that is valid for the dialogue; PDU=Protocol Data Unit.

SCCP over TCP/IP (SCCP Routing):

In the SAS the SCCP message is routed via SCCP over TCP/IP to the NP GTT application. The NP GTT application has an internal proprietary interface to the SDF which contains the number portability data. STP SCCP GTTs shall be modified in order to allow ISS messages to be routed to the SAS depending on the output of the GTT. Such a mechanism could be based on the Backup Destination field of the STP GTT, which is routing relevant when no GTT result could have been found.

The SAS SCCP shall provide an API (application programmer interface) with sufficient syntactic and semantic capabilities to allow execution of above SCCP user function.

For the communication between STP and SAS ASTP is used. TCAP messages are advantageously not directly transported over TCP but in syntactically correct SCCP messages.

Multiple SAS Servers per STP:

Up to e.g. 128 SAS servers shall be supported. Each SAS server shall be able to be equipped with up to two Ethernet ports and IP addresses, respectively.

Internal Interconnection:

All SAS servers shall be fully interconnected by means of the replicated internal Ethernet of the STP.

External Interconnection:

A physical connection of a SAS server is via the internal Ethernet of the STP. Logical communication of the SAS with external network elements is via the physical communication capabilities of the STP, such as TCP/IP/Ethernet and SCCP/MTP.

System Platform Requirements Applying to both FIG. 6 and FIG. 7:

It shall be possible to modify dynamically the traffic distribution tables for the communication from STP toward SAS. This may well include traffic distribution tables in the STP TCAP-over-IP functionality and SCCP-over-IP functionality as well as traffic distribution tables inside the SAS.

The communication system between SSE Core and SAS shall provide the following:

Fast distributed processing environment.

Mechanisms for scalability and high-availability.

High-available and distributed DBMS (database management system).

The cohabitation of Fixed Network NP, MNP, and other possible SS7 server applications on the same physical machine shall be feasible (this requirement can apply for situations where a customer requests a very large STP for a SS7 inter-network, which handles all kinds of SS7 traffic: fixed network, mobile network, etc.).

SAS of FIG. 6 and SAS of FIG. 7 can be combined to support both FNP and MNP. STP has then SS7 links to both switches of the fixed network and switches of the mobile network.

Figure 8:
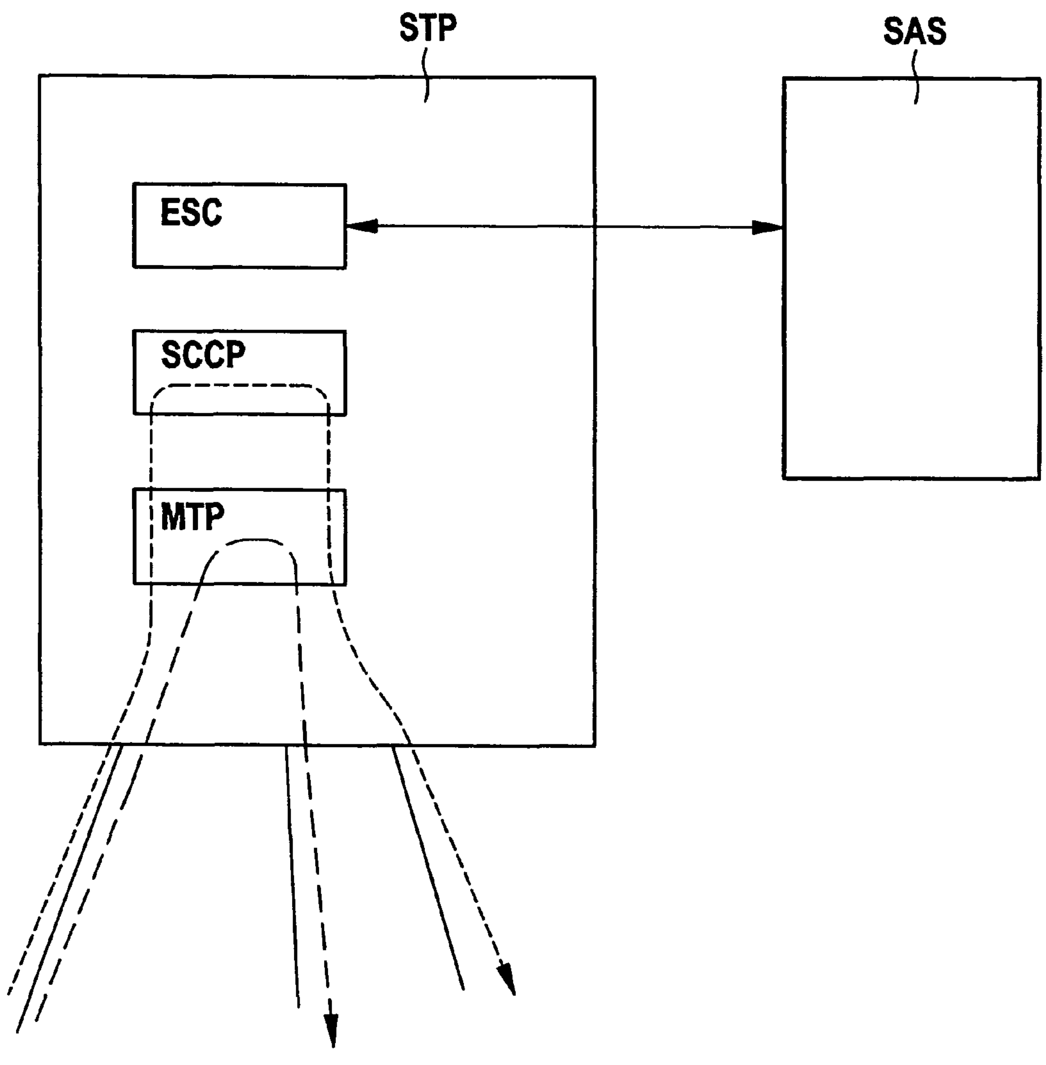
FIG. 8 is a a simplified block diagram of an exemplary SS7 signaling server according to the teachings of the present invention including a first and a second signaling process flow (traditional MTP and SCCP routing)

FIG. 8 is a a simplified block diagram of an exemplary SS7 signaling server according to the teachings of the present invention, corresponding to the SS7 signaling server of FIG. 1, and including a first and a second signaling process flow.

The STP includes at least one SCCP process, at least one MTP process, and at least one escape local user process ESC.

Each SCCP process serves to process SCCP contents in incoming SS7 messages.

Each MTP process serves to process MTP contents in incoming SS7 messages. The MTP process is capable of processing MTP1, MTP2, and MTP3 contents. For each MTPn one or more MTP processes could be used, n=1, 2, 3.

Each escape local user process ESC serves to identify a single application service request out of a SCCP or a MTP and to communicate with the SAS via the interworking protocol.

The STP is capable of routing incoming SS7 messages. A first signaling process flow shows an incoming SS7 message at a first input/output, a processing in the MTP process, and a corresponding outgoing SS7 message at a second input/output. A second signaling process flow shows an incoming SS7 message at the first input/output, a processing in the SCCP process, and a corresponding outgoing SS7 message at a third input/output. Both first and second signaling process flows are usual process flows in a current STP. In these cases the inventive escape local user process ESC is not needed.

Figure 9:
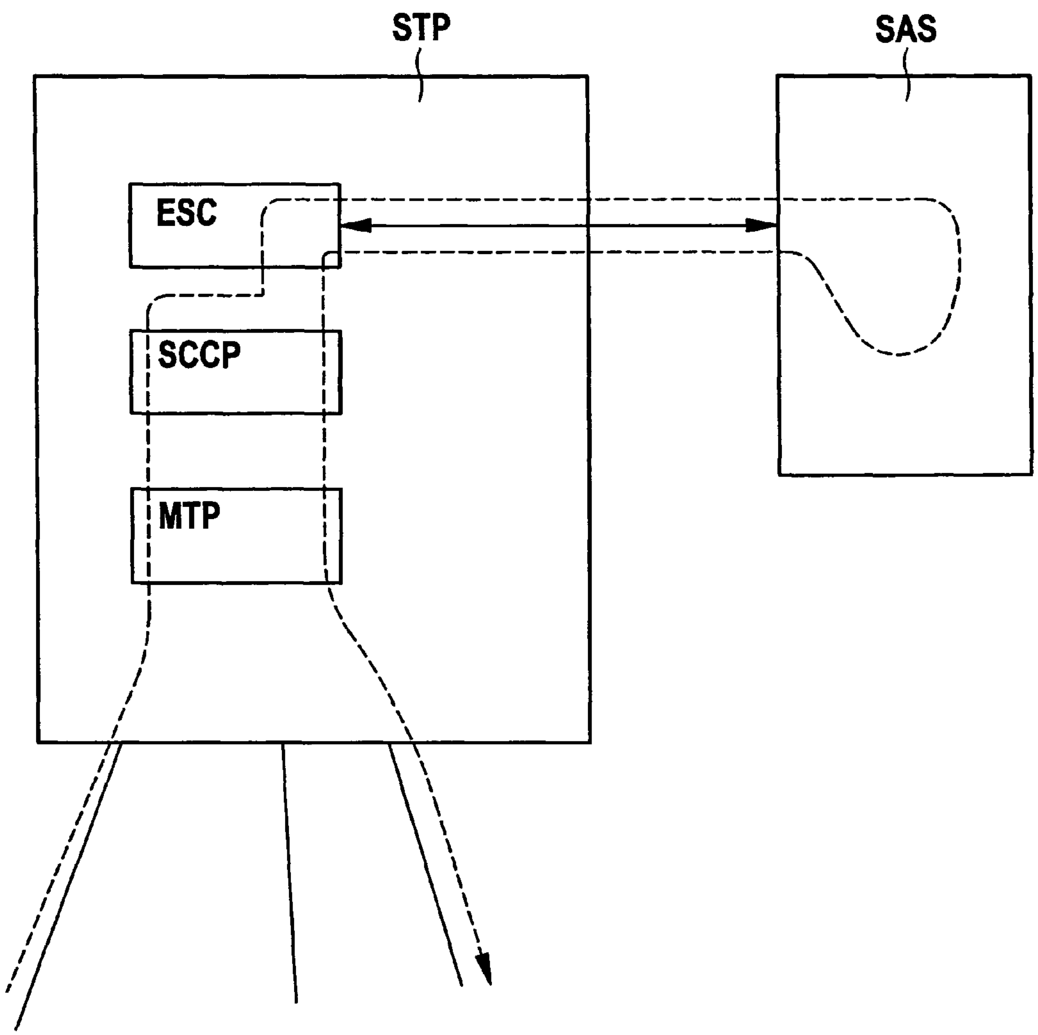
FIG. 9 is a simplified block diagram of an exemplary SS7 signaling server according to the teachings of the present invention including a third signaling process flow (advanced escape routing including SAS-SCCP based escape)

FIG. 9 is a simplified block diagram of an exemplary SS7 signaling server according to the teachings of the present invention, corresponding to the SS7 signaling server of FIG. 1, and including a third signaling process flow.

The third signaling process flow shows an incoming SS7 message at the first input/output, a processing in the SCCP process, a processing in the escape local user process ESC (=SCCP local user escape process), a processing in the SAS, a processing in the escape local user process ESC, a processing in the SCCP process, and a corresponding outgoing SS7 message at the third input/output.

The escape local user process ESC is used to identify a single application service request out of the SCCP. The identified single application service request is transmitted to the SAS via the interworking protocol. The SAS processes the identified service request and delivers the result back to the escape local user process ESC via the interworking protocol. The escape local user process ESC processes the result and delivers the processed result to the SCCP. The SCCP content will then be included in the outgoing SS7 message, which will be transmitted via a SS7 link.

In the third signaling process an interworking protocol between a STP for processing SS7 messages and SAS for processing application service requests is used. The interworking protocol is TCP/IP or UDP (user datagram protocol) over ethernet including at least one field reserved to include a single application service request to be processed in the SAS.

In general, different interaction scenarios between escape local user process ESC of STP and SAS are possible, e.g.

TCAP user terminating dialog: A request is delivered from ESC to SAS, a response is delivered back from SAS to ESC. The request is e.g. a number portability request. The response includes e.g. a corresponding address.

TCAP user relay: A request is delivered from ESC to SAS. A response including e.g. changed parameters is delivered back from SAS to ESC.

TCAP relay.

SCCP relay.

SAS initiated dialogs: A request is delivered from SAS to ESC, e.g. a wake-up call.

Although the present invention and its advantages have been described in detail, it should be understood that various changes, mutations, substitutions and alterations can be mode therein without departing from the spirit and scope of the invention as defined by the appended claims, e.g. including combinations of examples shown in different figures.

A processor is e.g. a digital signal processor or microprocessor. Equivalents to a processor are all kinds of processing units like controller, FPGA (freely programmable gate array), etc.

The invention is mainly implemented in software and independent of the programming language used. Equivalent to a software solution is a corresponding hardware solution or mixed hardware and software solution.

What is claimed is:

1. SS7 signaling server for routing SS7 links, including a signaling transfer point (STP) and a signaling application server (SAS), wherein the STP has at least one external interface to connect the STP via at least one SS7 link to at least one telecommunications unit, and an internal interface to connect the STP to the SAS, wherein the SAS is capable to process at least one application service request, and wherein the STP is capable to process incoming SS7 messages, to identify a single application service request in one incoming SS7 message, to provide the identified single application service request to the SAS for further processing.

2. The SS7 signaling server, as set forth in claim 1, wherein the STP is capable to receive a processed service request from the SAS, to include the processed service request into an outgoing SS7 message, and to transmit the outgoing message over an SS7 link.

3. The SS7 signaling server, as set forth in claim 1, wherein at least one telecommunications unit is a mobile switching center (MSC).

4. Method for routing SS7 links, comprising the steps of:

identifying in a signaling transfer point (STP) a single application service request in an incoming SS7 message, providing the identified single application service request to a signaling application server (SAS), which is capable of processing at least one application service, and processing the provided service request in the SAS.

5. The method, as set forth in claim 4, further comprising the steps of:

providing the processed service request to the STP, including the processed service request into an outgoing SS7 message, and transmitting the outgoing message over an SS7 link.

6. The method, as set forth in claim 4, further comprising the steps of:

identifying in the STP the single application service request out of a signaling connection control part (SCCP), identifying in the SAS an individual INAP, MAP, CAP, or any TCAP User, TCAP Relay, or SCCP Relay service request out of the provided service request according to an internal application service id, and distributing in the SAS the identified INAP, MAP, CAP, or any TCAP User, TCAP Relay, or SCCP Relay service request to a corresponding service library.

7. Signaling transfer point (STP) for routing SS7 links comprising at least one processor and at least one processing software to process incoming SS7 messages, to identify a single application service request in the incoming SS7 message, and to provide the identified single application service request to a signaling application server (SAS) for further processing.

8. Signaling transfer point (STP), as set forth in claim 7, wherein the at least one processing software includes an escape local user process to identify a single application service request out of a signaling connection control part (SCCP).

9. Signaling transfer point (STP), as set forth in claim 8, wherein the escape local user process is capable to receive processed single application service requests and to include the processed single application service requests into SCCPs, and wherein the at least one processing software is capable to build up SS7 messages including the processed single application service requests and to transmit these SS7 messages over SS7 links.

10. Signaling application server (SAS), comprising at least one processor and at least one processing software for processing at least one application service request, wherein the at least one processing software includes a signaling connection control part (SCCP) process and at least one transaction capabilities application part (TCAP) process to identify at least one application service request.

11. Signaling application server (SAS), as set forth in claim 10, wherein one TCAP process is capable to identify intelligent network application protocol (INAP) subsystem numbers (SSN) and another TCAP process is capable to process mobile application part (MAP) subsystem numbers (SSN).

12. Signaling application server (SAS), as set forth in claim 11, wherein an INAP service distributor process is provided to identify an individual INAP service request according to a service key and to distribute the identified INAP service request to a corresponding INAP service library, and wherein an MAP service distributor process is provided to identify an individual MAP service request and to distribute the identified MAP service request to a corresponding MAP service library.

13. Signaling application server (SAS), as set forth in claim 10, wherein a SCCP relay process is provided, and wherein a SCCP relay distributor process is provided to identify an individual SCCP relay request and to distribute the identified SCCP relay request to a corresponding SCCP relay library.

14. Processing software for a signaling application server (SAS) to process at least one application service request, wherein the processing software includes a signaling-connection control part (SCCP) process and at least one transaction capabilities application part (TCAP) processes to identify at least one application service request.

* * * * *